United States Patent
Leonard

(10) Patent No.: US 9,308,796 B2
(45) Date of Patent: Apr. 12, 2016

(54) GAS SPRING ASSEMBLY AND METHOD OF ADJUSTMENT

(71) Applicant: Joshua R. Leonard, Noblesville, IN (US)

(72) Inventor: Joshua R. Leonard, Noblesville, IN (US)

(73) Assignee: Firestone Industrial Products Company, LLC, Indianapolis, IN (US)

(*) Notice: Subject to any disclaimer, the term of this patent is extended or adjusted under 35 U.S.C. 154(b) by 400 days.

(21) Appl. No.: 13/755,892

(22) Filed: Jan. 31, 2013

(65) Prior Publication Data

US 2013/0192067 A1 Aug. 1, 2013

Related U.S. Application Data

(60) Provisional application No. 61/592,693, filed on Jan. 31, 2012.

(51) Int. Cl.
| | |
|---|---|
| *F16F 9/04* | (2006.01) |
| *B60G 15/12* | (2006.01) |
| *F16F 9/05* | (2006.01) |
| *B60G 11/27* | (2006.01) |

(52) U.S. Cl.
CPC .............. *B60G 15/12* (2013.01); *B60G 11/27* (2013.01); *F16F 9/05* (2013.01); *B60G 2202/152* (2013.01); *B60G 2204/126* (2013.01); *Y10T 29/49609* (2015.01)

(58) Field of Classification Search
CPC ........ B60G 15/12; B60G 11/28; B60G 11/27; B60G 2202/152; B60G 2204/126; F16F 9/05; F16F 9/049; F16F 9/0454
USPC ................. 267/64.27, 64.19, 64.21, 64.24
See application file for complete search history.

(56) References Cited

U.S. PATENT DOCUMENTS

| | | | |
|---|---|---|---|
| 2,999,682 A * | 9/1961 | Stump | F16F 9/049 267/64.23 |
| 3,475,015 A | 10/1969 | Hirst | |
| 4,509,730 A | 4/1985 | Shtarkman | |
| 4,877,223 A | 10/1989 | Hackett | |
| 6,402,128 B1 * | 6/2002 | Trowbridge | B60G 11/28 267/64.11 |
| 2004/0021258 A1* | 2/2004 | Leonard | F16F 9/0454 267/64.21 |
| 2010/0252970 A1* | 10/2010 | Leonard | B60G 11/28 267/64.21 |

FOREIGN PATENT DOCUMENTS

| | | |
|---|---|---|
| DE | 103 19 670 | 2/2004 |
| EP | 0 529 486 | 3/1993 |

OTHER PUBLICATIONS

Translation of EP 0 529 486.
Translation of DE 103 19 670.

* cited by examiner

*Primary Examiner* — Pamela Rodriguez
(74) *Attorney, Agent, or Firm* — Jason A. Houser; Fay Sharpe LLP

(57) ABSTRACT

A gas spring assembly that is displaceable between an extended condition and a compressed condition can include a first end member, a second end member, a flexible wall secured between the first and second end members, a spring chamber and a volume-displacing body disposed within the spring chamber. The body can be supported along one of the flexible wall and the first end member such that the body remains in spaced relation to at least the second end member in a compressed condition of the gas spring assembly. A method of adjusting a gas spring assembly is also included.

20 Claims, 7 Drawing Sheets

GAS SPRING ASSEMBLY AND METHOD OF ADJUSTMENT

BACKGROUND

The subject matter of the present disclosure broadly relates to the art of gas spring devices and, more particularly, to a gas spring assembly including an element for reducing gas spring volume to adjust performance characteristics of the gas spring assembly. Such a gas spring assembly can be included in or otherwise form a part of a suspension system. A method of adjusting a performance characteristic of a gas spring assembly is also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

As is well known, it is possible to vary the spring rate of a gas spring assembly, by increasing or decreasing the volume of pressurized gas operatively associated with the spring chamber of the gas spring assembly. In some cases, this is done by including an additional chamber, cavity or volume of pressurized gas in fluid communication with the spring chamber of the gas spring assembly, which can thereby alter one or more performance characteristics of the gas spring assembly. In other cases, additional component parts can be included within the spring chamber and can be secured on or along an end member of the gas spring assembly. One example of such a component is a jounce bumper. It will be appreciated that such component parts can reduce the volume of pressurized gas within the gas spring chamber and thereby alter one or more performance characteristics of the gas spring assembly.

Notwithstanding the wide usage and overall success of such known designs, it is believed to be generally desirable to develop new constructions and/or designs that may advance the art of gas spring devices.

BRIEF SUMMARY

One example of a gas spring assembly in accordance with the subject matter of the present disclosure can be displaceable between an extended condition and a compressed condition. The gas spring assembly can include a first end member, a second end member that is spaced from the first end member such that a longitudinal axis extends therebetween. The flexible wall can be secured between the first and second end members and can at least partially define a spring chamber. The volume-displacing body can be disposed within the spring chamber and can be secured to one of the first end member and the flexible wall such that the body remains in spaced relation to at least the second end member in a compressed condition of the gas spring assembly.

One example of a method of adjusting a gas spring assembly in accordance with the subject matter of the present disclosure can include providing a gas spring assembly that includes a spring chamber capable of containing a first volume of gas at a gas pressure. The method can also include introducing a volume-displacing body into the spring chamber such that the spring chamber is capable of containing a second volume of gas at the gas pressure with the second volume of gas being less than the first volume of gas.

One example of a method of assembling a gas spring assembly in accordance with the subject matter of the present disclosure can include providing a first end member, a second end member and a flexible wall with one of the first end member and the second end member including an opening formed therethrough. The method can also include securing the flexible wall between the first and second end members such that a spring chamber is at least partially defined therebetween. The method can further include introducing a first quantity of flowable polymeric material into the spring chamber through the opening and depositing the first quantity of flowable polymeric material on or along at least one of the first end member and the flexible wall.

In some cases, a method according to the foregoing paragraph can include securing the flowable polymeric material into a volume-displacing body secured along one of the first end member and the flexible wall.

Additionally, in some cases, a method according to either of the two foregoing paragraphs can include securing a support wall along one of the first end member and the flexible wall, and depositing the quantity of flowable polymeric material on or along at least a portion of the support wall.

Furthermore, in some cases, a method according to any of the three foregoing paragraphs can include depositing a second quantity of flowable polymeric material on or along at least one of the first quantity of flowable polymeric material and a surface of the volume-displacing body.

DETAILED DESCRIPTION

Figure 1:
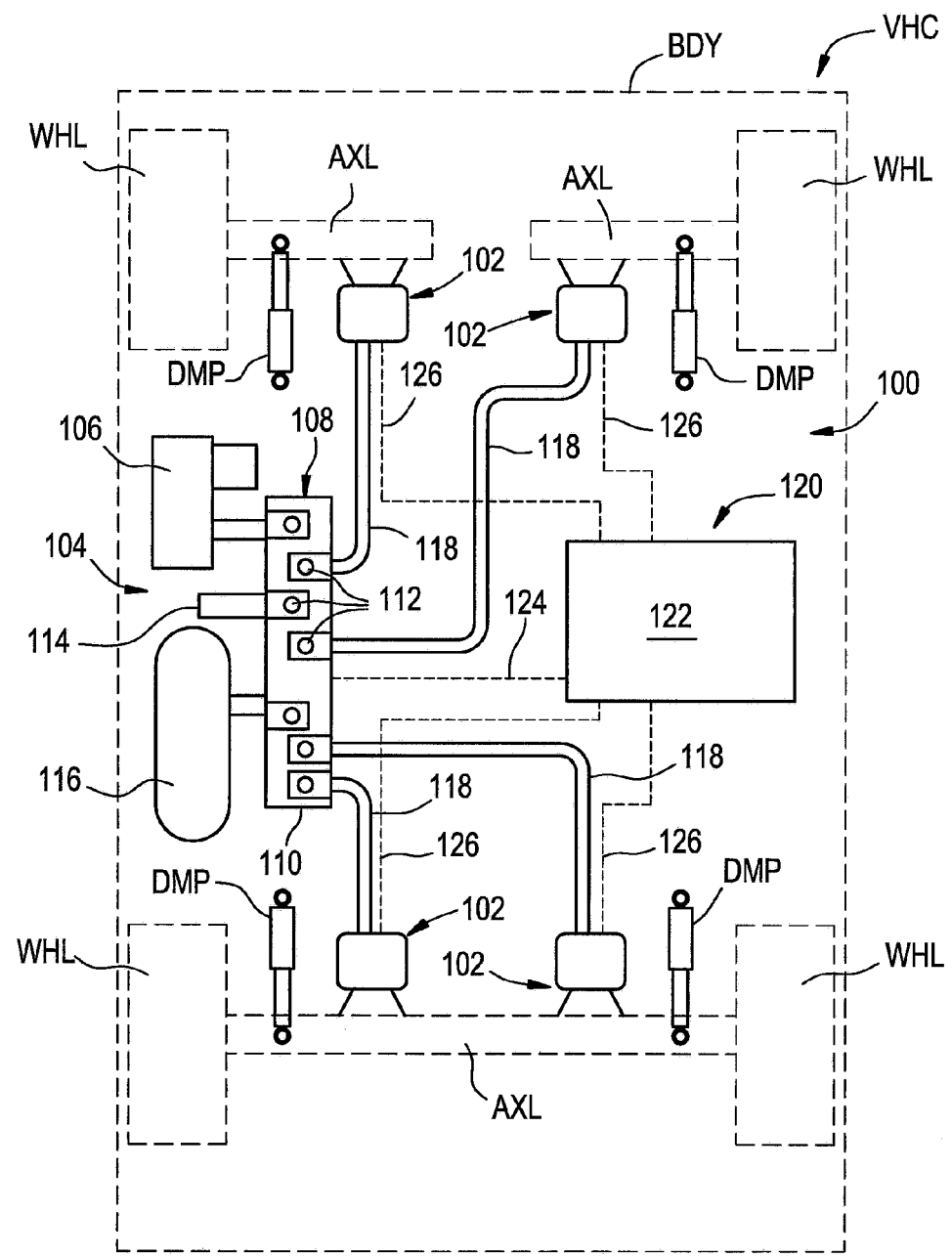
FIG. 1 is a schematic representation of one example of a suspension system of an associated vehicle including gas spring assemblies in accordance with the subject matter of the present disclosure.

Turning now to the drawings, wherein the showings illustrate examples of the subject matter of the present disclosure and which are not intended to be limiting, FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also optionally include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of any other type, kind and/or construction could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

Figure 2:
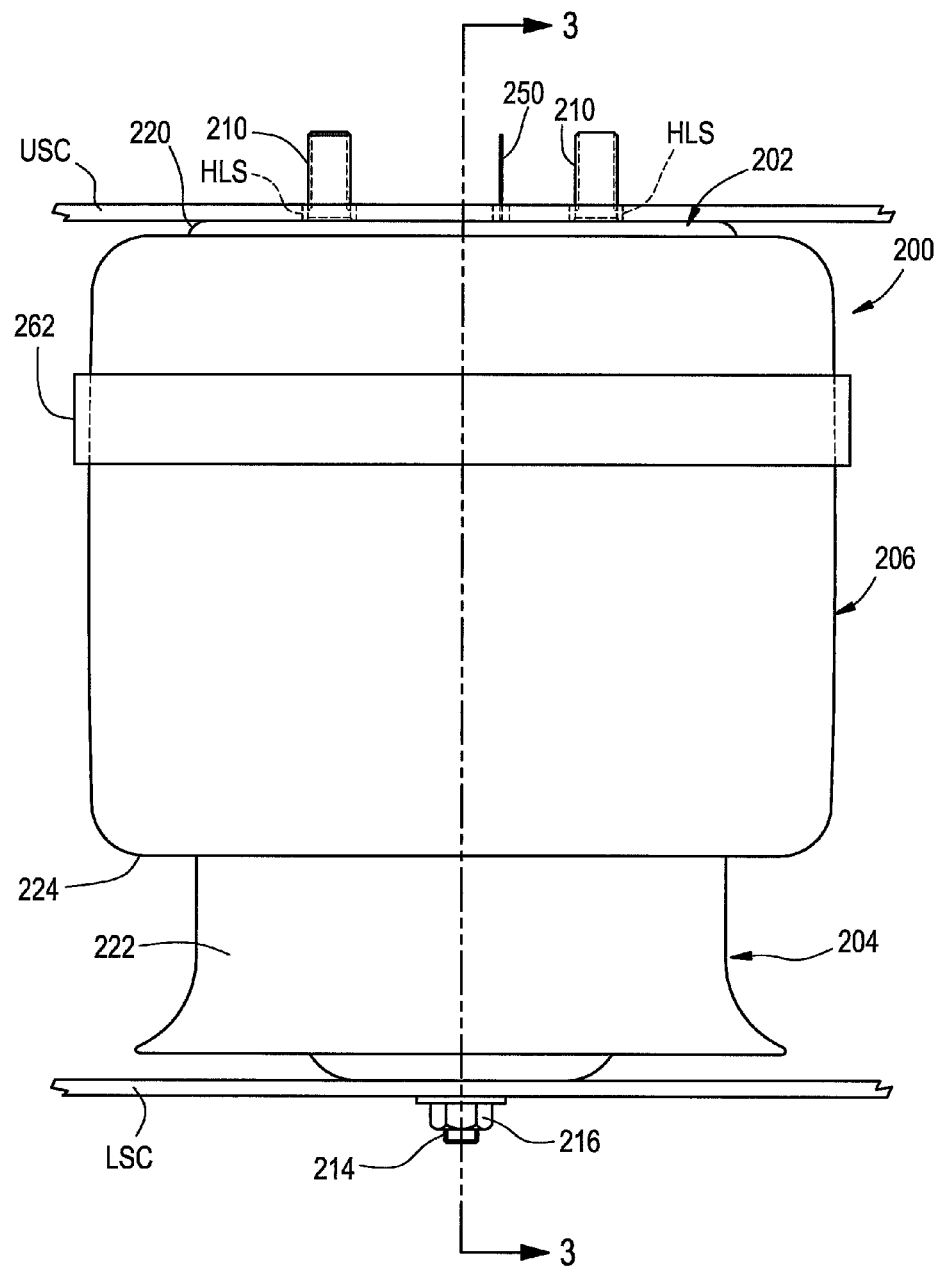
FIG. 2 is a side view of one example of a gas spring assembly in accordance with the subject matter of the present disclosure.
Figure 3:
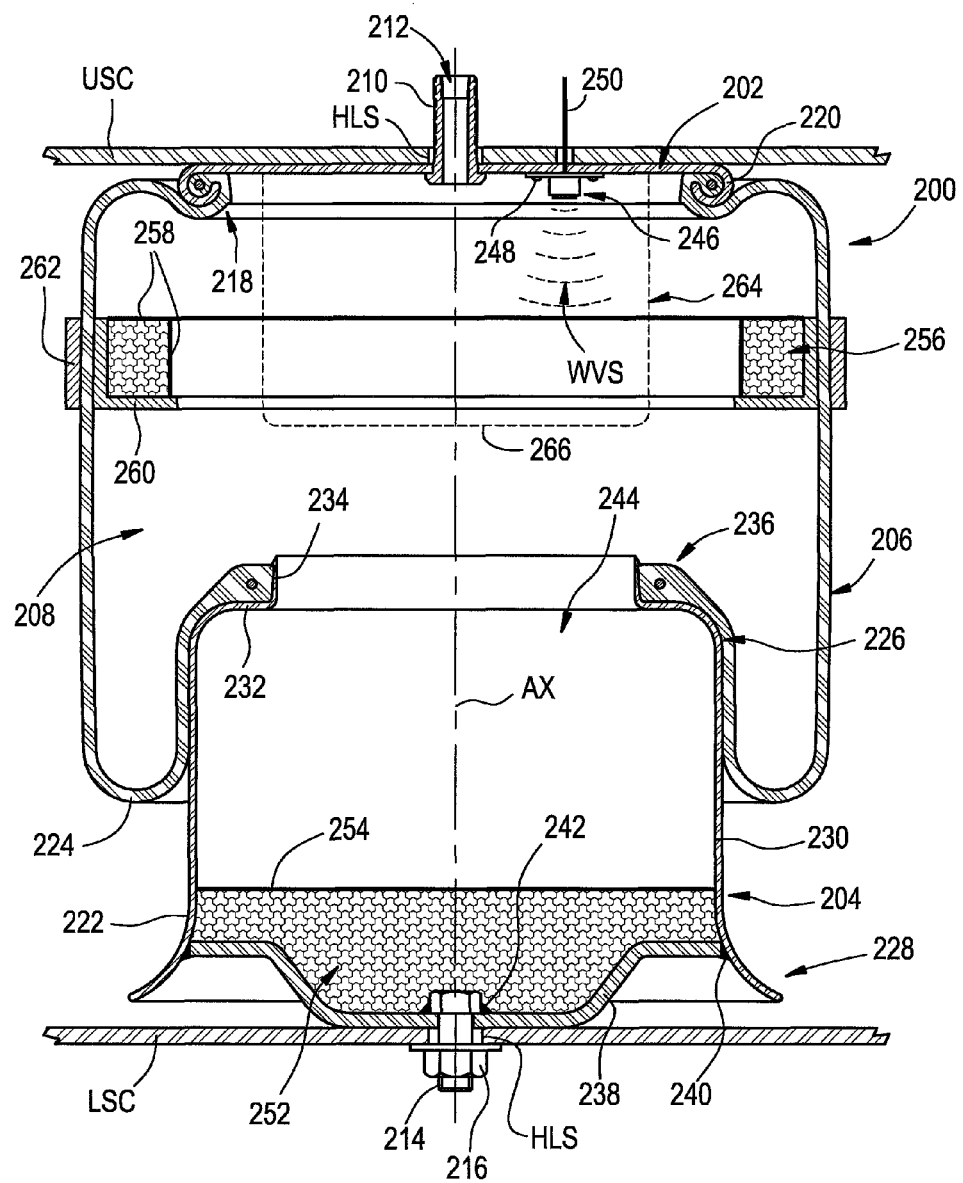
FIG. 3 is a cross-sectional side view of the gas spring assembly in FIG. 2 taken from along line 3-3 therein.

One example of a gas spring assembly 200 is shown in FIGS. 2 and 3 as having a longitudinally-extending axis AX (FIG. 3) and can include one or more end members, such as an end member 202 and an end member 204 that is spaced longitudinally from end member 202. A flexible wall 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts or other securement devices (not shown), for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 212 (FIG. 3), for example, can optionally be provided to permit fluid communication with spring chamber 208, such as may be used for transferring pressurized gas into and/or out of the spring chamber, for example. In the exemplary embodiment shown, transfer passage 212 extends through at least one of mounting studs 210 and is in fluid communication with spring chamber 208. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a mounting stud 214 could be operatively connected to end member 204 and could extend through one of mounting holes HLS to receive a corresponding threaded nut 216, for example.

It will be appreciated that the one or more end members can be of any suitable type, kind, construction and/or configuration, and can be operatively connected or otherwise secured to the flexible wall in any suitable manner. In the exemplary arrangement shown in FIGS. 2 and 3, for example, end member 202 is of a type commonly referred to as a bead plate that is secured to a first end 218 of flexible wall 206 using a crimped-edge connection 220. End member 204 is shown in the exemplary arrangement in FIGS. 2 and 3 as being of a type commonly referred to as a piston (or a roll-off piston) that has an outer side surface 222 that abuttingly engages flexible wall 206 such that a rolling lobe 224 is formed therealong. As gas spring assembly 200 is displaced between extended and collapsed conditions, rolling lobe 224 is displaced along outer side surface 222 in a conventional manner.

As identified in FIG. 3, end member 204 extends generally between a first or upper end 226 and a second or lower end 228. End member 204 can include an outer side wall 230 and an end wall 232 with the outer side wall at least partially defining outer side surface 222 and with the end wall disposed along end 226 and generally transverse to at least one of axis AX and outer side wall 230. One example of a connection between the flexible wall and the end member is shown in FIG. 3 in which an inner side wall 234 can extend longitudinally outwardly from end wall 232 in a direction away from end 228. Flexible wall 206 can include a second end 236 that is received along inner side wall 234 such that a substantially fluid-tight seal is formed therebetween. It is to be understood, however, that the arrangement shown and described is merely exemplary and that any other suitable construction and/or configuration can alternately be used.

End member 204 can also include a bottom wall 238 that is disposed along end 228 of the end member and can be secured on or along outer side wall 230 in any manner suitable for forming a substantially fluid-tight connection, such as by using a flowed-material joint 240, for example. In some cases, mounting stud 214 can be operatively connected to bottom wall 238 in a manner suitable for forming a substantially fluid-tight seal therewith, such as by using a flowed-material joint 242, for example. Additionally, end member 204 can, optionally, include a chamber 244 that is at least partially formed therein and in fluid communication with spring chamber 208. In the exemplary arrangement shown, chamber 244 is at least partially defined by outer side wall 230, end wall 232, inner side wall 234 and bottom wall 238.

A height or distance sensing device 246 is, optionally, shown in FIGS. 2 and 3 as being disposed within spring chamber 208 along end member 202 and being secured thereto using suitable fasteners 248. Height sensing device 246 can be of any suitable type, kind and/or construction, such as an ultrasonic sensor that transmits and receives ultrasonic waves WVS (FIG. 3), for example. Additionally, it will be appreciated that height sensing device 246 can be connected to other systems and/or components of a vehicle suspension system in any suitable manner. As shown in FIGS. 2 and 3, height sensing device 246 includes a lead or connection 250 that can be used for such communication purposes, such as is indicated by leads 126 of control system 120 in FIG. 1, for example.

A gas spring assembly in accordance with the subject matter of the present disclosure, such as gas spring assembly 200, for example, can include on or more volume-displacing bodies disposed within the gas spring assembly. In the arrangement shown in FIG. 3, for example, gas spring assembly 200 includes a body 252 disposed within chamber 244 and in abutting engagement with outer side wall 230 and bottom wall 238 along end 228 of end member 204. In some cases, body 252 can be formed from substantially rigid polymeric foam material, and can be of a closed-cell type foam to provide reduced permeability of the pressurized gas within chambers 208 and 244. Alternately, an open-cell foam can be used. In either case, a skin or coating 254 can, optionally, extend across at least a portion of body 252, such as to provide structure to the volume-displacing body, to limit permeability and/or to protect the volume-displacing body.

Additionally, or in the alternative, a body 256 can be provided on or along a flexible wall of the gas spring assembly, such as along flexible wall 206, for example. As discussed above, body 256 can, optionally, include a skin or coating 258 disposed along one or more surfaces thereof. Body 256 can be supported on the flexible wall in any suitable manner, such as by abuttingly engaging a support structure 260 that is operatively secured to the flexible wall, such as by way of a crimp ring 262, for example. It will be appreciated, however, that other arrangements could alternately be used.

Figure 4:
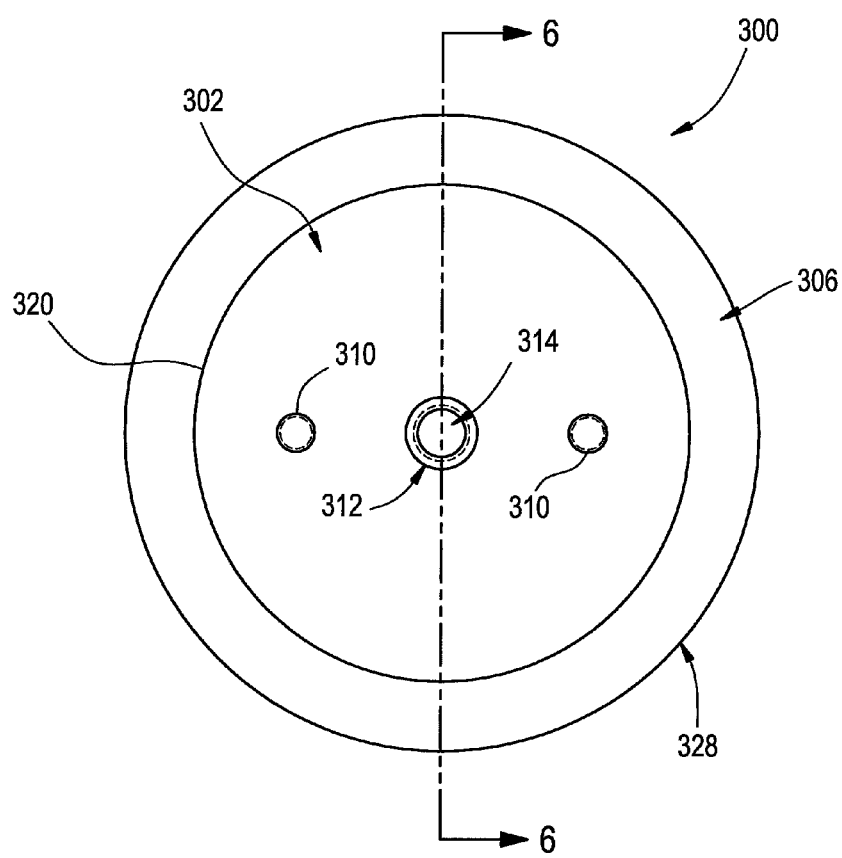
FIG. 4 is a top plan view of another example of a gas spring assembly in accordance with the subject matter of the present disclosure.
Figure 5:
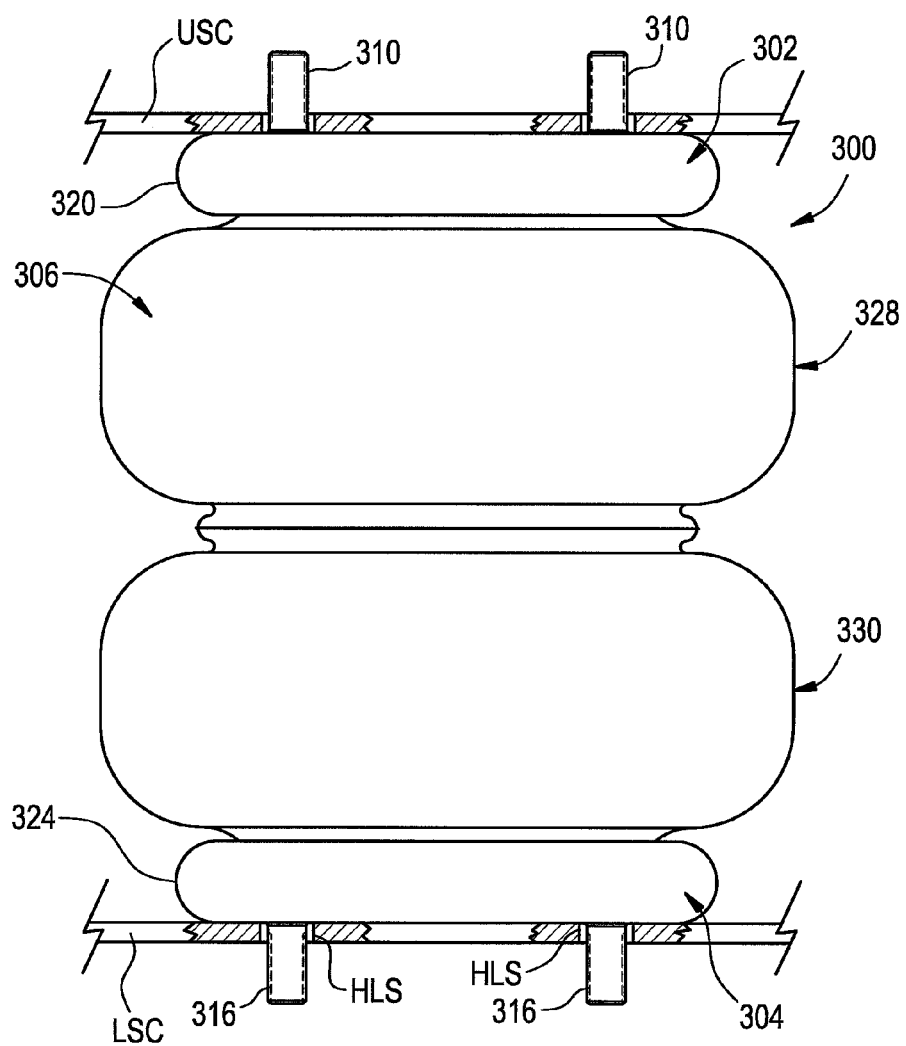
FIG. 5 is a side view of the gas spring assembly in FIG. 4.
Figure 6:
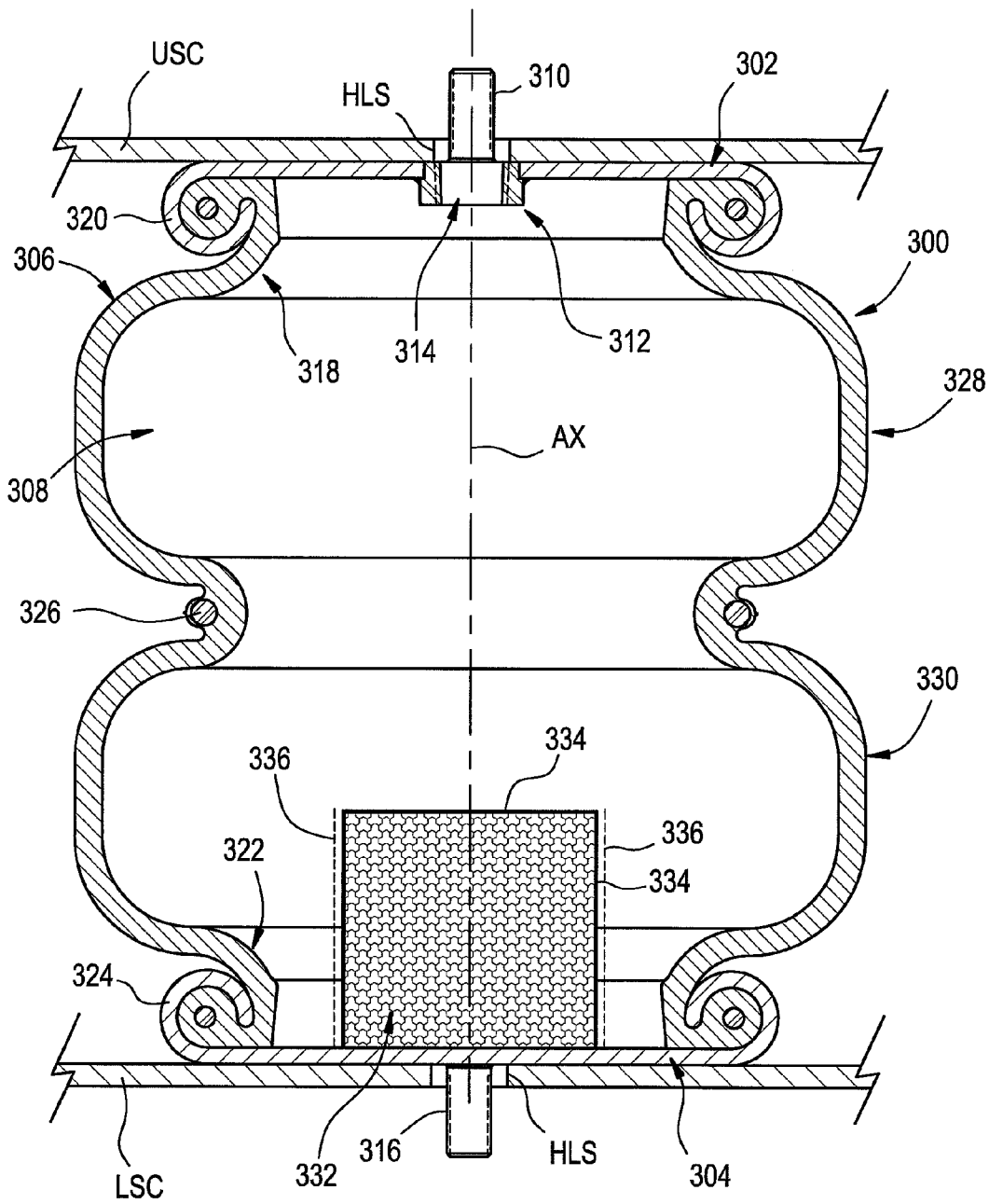
FIG. 6 is a cross-sectional side view of the gas spring assembly in FIGS. 4 and 5 taken from along line 6-6 in FIG. 4.

Another example of a gas spring assembly 300 is shown in FIGS. 4-6 as having a longitudinally-extending axis AX, and can include one or more end members, such as an end member 302 and an end member 304 that is spaced longitudinally from end member 302. A flexible wall 306 can extend peripherally around axis AX and can be secured between the end members in a substantially fluid-tight manner such that a spring chamber 308 (FIG. 6) is at least partially defined therebetween.

Gas spring assembly 300 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIGS. 5 and 6, for example, end member 302 is secured along a first or upper structural component USC, such as associated vehicle body BDY in FIG. 1, for example, and can be secured thereon in any suitable manner. For example, one or more securement devices, such as mounting studs 310, for example, can be included along end member 302. In some cases, the one or more securement devices (e.g., mounting studs 310) can project outwardly from end member 302 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts or other securement devices (not shown), for example.

Additionally, one or more gas transfer ports can optionally be provided to permit fluid communication with spring chamber 308, such as may be used for transferring pressurized gas into and/or out of the spring chamber. For example, a connection can be provided on or along one of the end members (e.g., end member 302) such as may be used for attachment of a gas transfer line (e.g., one of gas transfer lines 118 in FIG. 1). In the exemplary arrangement shown in FIGS. 4-6, a connector fitting 312 is provided on or along one of the end members (e.g., end member 302) such as may be used for attachment of one of gas transfer lines 118 in FIG. 1, for example, and can include a passage 314 extending through the end member in fluid communication with spring chamber 308.

End member 304 can be secured along a second or lower structural component LSC, such as an axle AXL in FIG. 1, for example, in any suitable manner. As one example, lower structural component LSC could include one or more mounting holes HLS extending therethrough. One or more securement devices, such as mounting studs 316, for example, can be included along end member 304. In some cases, the one or more securement devices (e.g., mounting studs 316) can project outwardly from end member 304 and can be secured thereon in a suitable manner, such as, for example, by way of a flowed-material joint (not shown) or a press-fit connection (not identified). Additionally, such one or more securement devices can extend through mounting holes HLS in lower structural component USC and receive one or more threaded nuts or other securement devices (not shown), for example. As an alternative to one or more of mounting studs 310 and/or 316, one or more threaded passages (e.g., blind passages and/or through passages) could be used in conjunction with a corresponding number of one or more threaded fasteners.

It will be appreciated that the one or more end members can be of any suitable type, kind, construction and/or configuration, and can be operatively connected or otherwise secured to the flexible wall in any suitable manner. In the exemplary arrangement shown in FIGS. 4-6, for example, end members 302 and 304 are of a type commonly referred to as a bead plate. End member 302 is shown as being secured to a first end 318 of flexible wall 306 using a crimped-edge connection in which an outer peripheral edge 320 of the end member is crimped or otherwise deformed about a portion of first end 318 of flexible wall 306 such that a substantially fluid-tight seal is formed therebetween. Similarly, end member 304 is shown as being secured to a second end 322 of flexible wall 306 using a crimped-edge connection in which an outer peripheral edge 324 of the end member is crimped or otherwise deformed about a portion of second end 322 of flexible wall 306 such that a substantially fluid-tight seal is formed therebetween.

Gas spring assembly 300 is shown as being of a type commonly referred to as a convoluted or bellows-type construction, and it will be appreciated that any suitable type or kind of convoluted spring construction can be used. As such, the flexible wall of the gas spring assembly can have any suitable number of one or more convoluted wall portions disposed between the opposing end members. In the exemplary embodiment shown in FIGS. 4-6, flexible wall 306 includes a girdle hoop 326 (FIG. 6) disposed approximately midway along the flexible wall. A convoluted wall portion 328 extends between the girdle hoop and end member 302, and a convoluted wall portion 330 extends between the girdle hoop and end member 304.

A gas spring assembly in accordance with the subject matter of the present disclosure, such as gas spring assembly 300, for example, can include one or more volume-displacing bodies disposed within the gas spring assembly. In the arrangement shown in FIG. 6, for example, gas spring assembly 300 includes a body 332 disposed within spring chamber 308 and in abutting engagement with end member 304. In some cases, body 332 can be formed from substantially rigid polymeric foam material, and can be of a closed-cell type foam to provide reduced permeability of the pressurized gas within spring chamber 308. Alternately, an open-cell foam can be used. In either case, a skin or coating 334 can, optionally, extend along or across one or more surfaces of body 332, such as to provide structure to the volume-reducing body, to limit permeability and/or to protect the volume-reducing body. Additionally, in some cases, a form or other external structure can be included within the spring chamber prior to introduction of the component materials that form the volume-displacing body, such as to assist in establishing the size, shape and/or configuration of the body prior to and during the curing process. Such a form or external structure is represented in FIG. 6 by dashed lines 336, which can represent forms or structures that are removable, degradable or permanently included within the spring chamber.

It will be appreciated that conventional jounce bumpers and other such components that may, in some cases, be formed from or otherwise include a elastomeric foam material. Importantly, however, non-metallic bodies in accordance with the subject matter of the present disclosure, such as bodies 252, 256 and/or 332, for example, differ from conventional jounce bumpers and other such components in several respects. For example, known jounce bumpers are pre-constructed and assembled into the gas spring assembly prior to securing at least one of the end members to the flexible wall. It should be recognized that gas spring assemblies are typically permanently assembled in a manner that prevents disassembly without destruction of one or more of the component parts of the gas spring assembly. As such, known jounce bumpers cannot be used to alter the volume of the spring chamber of a gas spring assembly once assembled. Whereas, a non-metallic, volume-displacing body in accordance with the subject matter of the present disclosure can be formed inside a gas spring assembly in an assembled condition to thereby vary, alter or otherwise adjust the volume of the spring chamber and/or one or more performance characteristics of the gas spring assembly.

Additionally, it will be appreciated that gas spring assemblies are displaced during use between an extended condition and a compressed condition. Generally, conventional jounce bumpers are supported on one end member and dimensioned to abuttingly engage the opposing end member in a compressed condition of the gas spring assembly. In this manner, conventional jounce bumper assemblies can inhibit contact between the opposing end members under jounce (i.e., compressed) conditions of the gas spring assembly. By contrast, non-metallic, volume-displacing bodies in accordance with the subject matter of the present disclosure, such as bodies 252, 256 and/or 332, for example, differ from conventional jounce bumpers in that such non-metallic bodies can be supported within the spring chamber of a gas spring assembly such that the non-metallic bodies are maintained in spaced relation to at least one of the end members of the gas spring assembly in compressed conditions thereof.

One example of such a construction is schematically represented in FIG. 3 in which a jounce bumper 264 of a conventional construction is supported on end member 202 and includes a distal surface 266 that can abuttingly engage end member 204 under compressed conditions of gas spring assembly 200. It will be recognized and appreciated that under such compressed conditions, body 252 would be disposed and would remain in spaced relation to end member 202. Additionally, or in the alternative, body 256 would be disposed and would remain in spaced relation to at least one of end members 202 and 204 under compressed conditions of the gas spring assembly.

Figure 7:
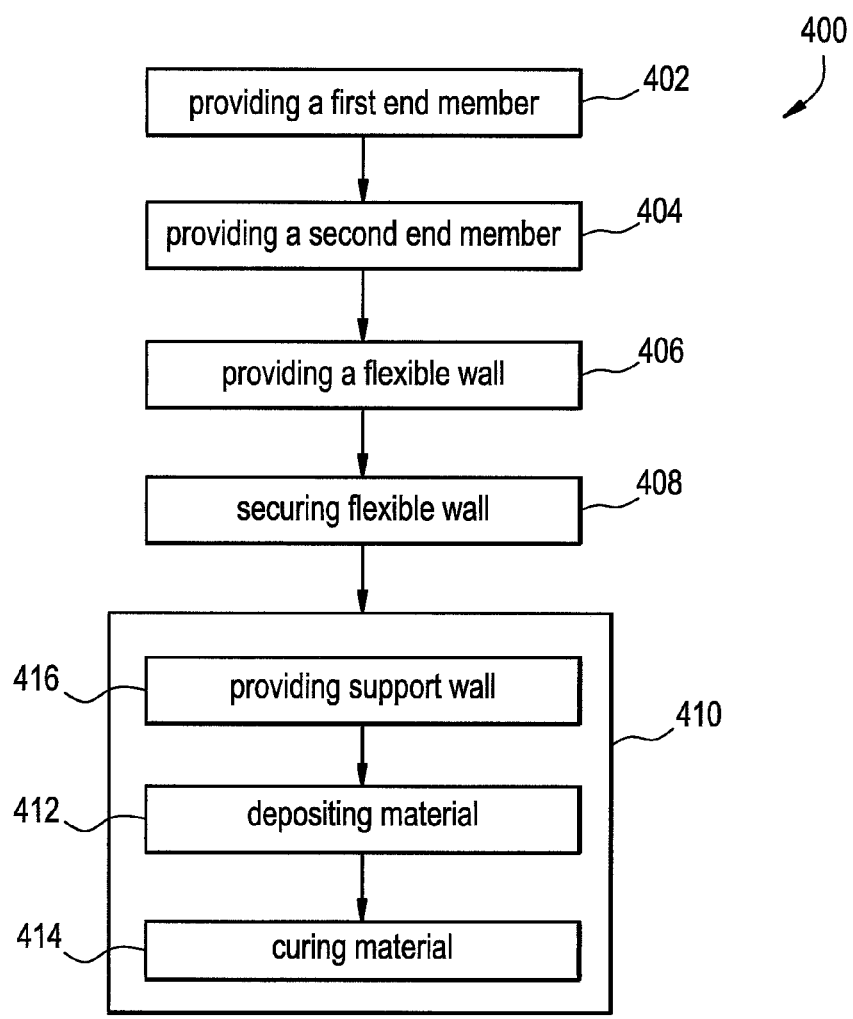
FIG. 7 is a graphical representation of one example of a method of adjusting a gas spring assembly in accordance with the subject matter of the present disclosure.

One example of a method 400 of adjusting one or more performance characteristics (e.g., spring rate) of a gas spring assembly is graphically represented in FIG. 7. Method 400 can include providing a first end member (e.g., one of end members 202, 204, 302 and 304) and providing a second member (e.g., a different one of end members 202, 204, 302 and 304), as is represented by item numbers 402 and 404, respectively. Method 400 can also include providing a flexible wall (e.g. one of flexible walls 206 and 306) and securing the flexible wall to the first and second end members such that a spring chamber (e.g. spring chamber 208 or 308) is at least partially defined therebetween, as is represented by item numbers 406 and 408, respectively.

Method 400 can also include introducing a volume-displacing body (e.g., one or more of bodies 252, 256 and/or 332) into the spring chamber of a gas spring assembly, as is represented in FIG. 7 by item number 410. In some cases, the action of introducing a volume-displacing body of method 400 can include depositing a quantity of flowable material into the spring chamber in an assembled condition of the gas spring assembly, as is represented by item number 412. In such cases, method 400 can include curing or otherwise converting the quantity of flowable material into a unitary body, as is represented by item number 414. In some cases, method 400 can include providing a support wall or structure on, along or within which the quantity of flowable material can be deposited or otherwise introduced, as is represented by item number 416.

Thus, it will be appreciated that one method of tuning or otherwise adjusting a gas spring assembly is to add or subtract internal volume to affect the dynamic pressures which govern the spring rate. The subject matter of the present disclosure involves a gas spring assembly with a generally maximized internal volume. In order to provide a gas spring assembly with a reduced gas volume, such as may be desirable to provide a certain associated spring rate, for example, a flowable material, such as a foamable polymeric fluid, for example, can be introduced, deposited or otherwise applied inside the internal volume of the gas spring assembly (e.g., within the spring chamber and/or piston chamber). In a preferred arrangement, the flowable material can be allowed to expand and cure according to a pre-established expansion ratio, such that a predetermined amount of volume within the spring chamber is displaced in a relatively permanent manner. In an expanded, cured or otherwise non-flowing state, a volume-displacing body will, preferably, not interfere with the operation of the gas spring assembly or any internal components thereof, such as the operation of a jounce bumper and/or internal damper, for example. In some cases, a permanent, degradable or removable form could be included within the gas spring assembly, such as to control the geometry and/or size of the volume-displacing body, as needed. Thus, several gas spring designs could be rapidly obtained with a minimum number of different components.

It will be appreciated that any suitable type or kind of non-metallic material could be used, such as a flowable polymeric material, for example. In a preferred arrangement, a foamable polymeric material that forms a closed-cell foam could be used, such as to reduce pressurized gas absorption. In other cases, a foamable polymeric material that forms an open-cell foam could be used together with a coating, such as a resin, for example, that could be applied to the foam to provide structure, limit permeability and/or provide added protection to the volume-displacing body. Polymeric foam materials such as, but not limited to, polystyrene and polyurethane could be applied with a foaming device, or after mixing two or more reaction components. Additionally, it will be appreciated that the flowable polymeric material can be introduced or otherwise applied to one or more components prior to the full assembly of the gas spring assembly. For example, polymeric foam material could be applied to a component (e.g., one of end members 202, 204, 302 and/or 304) prior to attachment to the flexible wall. Alternately, flowable material could be introduced, deposited or otherwise applied one or along a component in an assembled condition of the gas spring assembly, such as through an passage or port, for example.

Reaction components and/or other foam materials can be introduced into the gas spring assembly in any suitable manner. As one example one or more packets, each containing a quantity of a reaction component, could be introduced into the gas spring assembly. As another example, one or more packets that each contains a quantity of two or more reaction components in segregated compartments could be introduced into the gas spring assembly. In either case, upon the intentional disruption of the one or more packets and/or the one or more compartments thereof, such as by crushing, heating or any other suitable manner, the components would be allowed to mix with air or one or more of the other components. As a result, a foam body having a predetermined volume corresponding to the quantities of components can be formed, such as while conforming to a shape, form and/or portion of the gas spring assembly or a component thereof.

Additionally, in some cases, the volume-displacing body could perform one or more additional functions within the gas spring assembly. For example, a body formed from a material of suitable strength or rigidity could be included within the gas spring assembly and could operate as a jounce bumper, an emergency stop or a mounting element. In other cases, however, that in other cases the volume-displacing body can be maintained in spaced relation to at least one of the end members in a jounce (i.e., compressed) condition of the gas spring assembly.

It will be recognized and appreciated that a gas spring assembly in accordance with the subject matter of the present disclosure, such as, for example, have been shown and described herein as gas spring assemblies 102, 200 and/or 300, can be used in connection with a suspension system, such as suspension system 100, for example. It is to be understood that the subject matter of the present disclosure is intended to encompass any and all combinations of the different features, components, assemblies and/or systems that are shown and described herein, and, without limitation, that any suitable arrangement of features, components, assemblies and/or systems, in any combination, can be used.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly displaceable between an extended condition and a compressed condition, said gas spring assembly comprising:
a first end member including an opening extending therethrough with said opening having a cross-sectional dimension;
a second end member spaced from said first end member such that a longitudinal axis extends therebetween;
a flexible wall secured between said first and second end members and at least partially defining a spring chamber;
a support wall secured along said second end member and at least partially defining a cavity; and,
a volume-displacing body disposed within said spring chamber and at least partially within said cavity such that said volume-displacing body is secured to said second end member and such that said volume-displacing body remains in spaced relation to said first end member in a compressed condition of said gas spring assembly, said volume-displacing body being at least partially formed from a flowable polymeric material introduced into said spring chamber through said opening in said first end member such that in a cured condition said volume-displacing body has a cross-sectional dimension that is greater than said cross-sectional dimension of said opening.

2. A gas spring assembly according to claim 1, wherein said volume-displacing body is a first volume-displacing body, and said gas spring assembly further comprises a second volume-displacing body secured along said flexible wall.

3. A gas spring assembly according to claim 2, wherein said support wall is a first support wall, and said gas spring assembly further comprises a second support wall secured to said flexible wall with said second volume-displacing body disposed in abutting engagement with at least one of said second support wall and said flexible wall.

4. A gas spring assembly according to claim 1, wherein said second end member includes a wall that at least partially defines an end member chamber, and at least a portion of said first volume-displacing body is disposed within said end member chamber.

5. A gas spring assembly according to claim 4, wherein said wall of said second end member is an outer side wall extending longitudinally along said second end member, and said second end member includes a bottom wall disposed transverse to said longitudinal axis with said outer side wall and said bottom wall at least partially defining said end member chamber, and said first volume-displacing body disposed in abutting engagement with at least one of said outer side wall and said bottom wall.

6. A gas spring assembly according to claim 1, wherein said volume-displacing body is at least partially formed from a closed-cell polymeric foam material.

7. A gas spring assembly according to claim 1, wherein said volume-displacing body is at least partially formed from an open-cell polymeric foam material.

8. A gas spring assembly according to claim 7, wherein said volume-displacing body includes a coating extending along at least a portion of said open-cell polymeric foam material of said volume-displacing body.

9. A gas spring assembly according to claim 8, wherein said coating is formed from a polymeric material that is different from said open cell polymeric foam material and provides at least one of structure to said volume-displacing body, reduced permeability of pressured gas, and protection along at least one surface of said volume-displacing body.

10. A gas spring assembly according to claim 1, wherein said support wall is one of permanently affixed to said second end member, removably secured to said second end member and at least partially formed from a degradable material.

11. A gas spring assembly according to claim 1, wherein said flexible wall is one of a convoluted-style including one or more convolutions disposed between said first and second end members and a rolling lobe-style that forms a rolling lobe along said second end member.

12. A gas spring assembly displaceable between an extended condition and a compressed condition, said gas spring assembly comprising:
a first end member;
a second end member spaced from said first end member such that a longitudinal axis extends therebetween with one of said first and second end members including an opening extending therethrough and having a cross-sectional dimension;

a flexible wall secured between said first and second end members and at least partially defining a spring chamber;

a support wall secured along said first end member that at least partially defines a cavity; and, a volume-displacing body disposed within said spring chamber and secured to one of said first end member and said flexible wall such that said body remains in spaced relation to at least said second end member in said compressed condition of said gas spring assembly, said volume-displacing body being at least partially formed from a flowable polymeric material introduced into said spring chamber through said opening such that said volume-displacing body is at least partially disposed within said cavity, and such that in a cured condition said volume-displacing body has a cross-sectional dimension that is greater than said cross-sectional dimension of said opening.

13. A gas spring assembly according to claim 12, wherein said support wall is one of permanently affixed to said first end member, removably secured to said first end member and at least partially formed from a degradable material.

14. A gas spring assembly according to claim 12, wherein said flexible wall is one of a convoluted-style including one or more convolutions disposed between said first and second end members and a rolling lobe-style that forms a rolling lobe along one of said first and second end members.

15. A gas spring assembly according to claim 12, wherein said volume-displacing body is at least partially formed from a closed-cell polymeric foam material.

16. A gas spring assembly according to claim 12, wherein said volume-displacing body is at least partially formed from an open-cell polymeric foam material.

17. A gas spring assembly according to claim 16, wherein said volume-displacing body includes a coating extending along at least a portion of said open-cell polymeric foam material.

18. A gas spring assembly according to claim 17, wherein said coating is formed from a polymeric material that is different from said open cell polymeric foam material and provides at least one of structure to said volume-displacing body, reduced permeability of pressured gas, and protection along at least one surface of said volume-displacing body.

19. A gas spring assembly according to claim 12, wherein said volume-displacing body is a first volume-displacing body, and said gas spring assembly further comprises a second volume-displacing body secured along said flexible wall.

20. A gas spring assembly according to claim 19, wherein said support wall is a first support wall, and said gas spring assembly further comprises a second support wall secured to said flexible wall with said second volume-displacing body disposed in abutting engagement with at least one of said second support wall and said flexible wall.

* * * * *